United States Patent [19]

Endo et al.

[11] Patent Number: 5,679,612
[45] Date of Patent: Oct. 21, 1997

[54] HIGH-ZIRCONIA FUSED REFRACTORIES

[75] Inventors: Shigeo Endo; Kimio Hirata; Shinji Tsuchiya; Shozo Seo, all of Tokyo, Japan

[73] Assignee: Toshiba Monofrax Co., Ltd., Japan

[21] Appl. No.: 508,756

[22] Filed: Jul. 31, 1995

[30] Foreign Application Priority Data

Aug. 10, 1994 [JP] Japan .................. 6-208249
Apr. 6, 1995 [JP] Japan .................. 7-104587

[51] Int. Cl.$^6$ ............................ C04B 35/484
[52] U.S. Cl. ........................ 501/104; 501/105
[58] Field of Search ...................... 501/104, 105

[56] References Cited

U.S. PATENT DOCUMENTS

| | | | |
|---|---|---|---|
| 3,519,448 | 7/1970 | Alper et al. | 501/104 |
| 3,632,359 | 1/1972 | Alper et al. | 501/104 |
| 4,336,339 | 6/1982 | Okumiya et al. | 501/104 |
| 4,705,763 | 11/1987 | Hayashi et al. | 501/105 |
| 5,023,218 | 6/1991 | Zanoli et al. | 501/105 |
| 5,086,020 | 2/1992 | Isino et al. | 501/105 |
| 5,344,801 | 9/1994 | Kida et al. | 501/105 |
| 5,466,643 | 11/1995 | Ishino et al. | 501/105 |

*Primary Examiner*—Karl Group
*Assistant Examiner*—David Sample
*Attorney, Agent, or Firm*—Lorusso & Loud

[57] ABSTRACT

High-zirconia fused refractories consist essentially of 85–96 wt % of $ZrO_2$, 3–8 wt % of $SiO_2$, 0.1–2 wt % of $Al_2O_3$, 0.05–3 wt % of $B_2O_3$, 0.05–3 wt % of BaO, SrO and MgO in total, 0.05 wt % or more of $Na_2O$, 0.05–0.6 wt % of $Na_2O$ and $K_2O$ in total, and 0.3 wt % or less of $Fe_2O_3$ and $TiO_2$ in total, and does not substantially contain $P_2O_5$ and/or CuO.

16 Claims, 1 Drawing Sheet

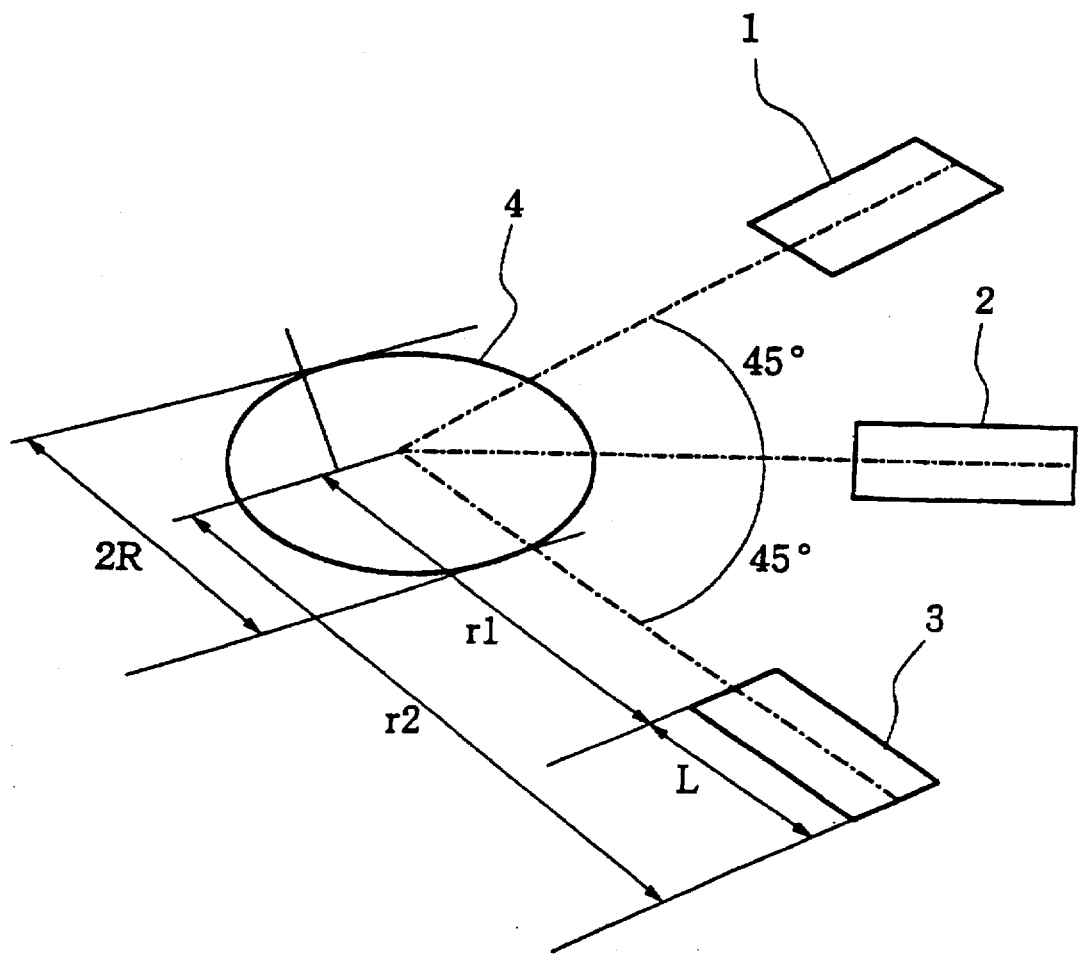

HIGH-ZIRCONIA FUSED REFRACTORIES

BACKGROUND OF THE INVENTION

The present invention relates to high-zirconia fused refractories suitable for a glass melting furnace, and having high corrosion resistance and no cracks and more particularly relates to high-zirconia fused refractories with highly improved thermal spalling characteristics and electrical properties.

Fused refractories having high concentrations of $ZrO_2$ (zirconia, also called zirconium oxide) have been extensively used in glass melting furnaces. This is because $ZrO_2$ (zirconia) is particularly corrosion resistant to molten glass. Examples of such refractories include $Al_2O_3$-$ZrO_2$-$SiO_2$ (hereinafter referred to as AZS) refractories with 34–41 wt % of $ZrO_2$, and high-zirconia fused refractories with 80 wt % or more of $ZrO_2$.

High-zirconia fused refractories have been recently preferred because of their many advantages. For example, refractories of this type are corrosion-resistant to any kind of molten glass due to their high $ZiO_2$ (zirconia) content and dense structure. Another feature is that they do not cause stones and cords to form in the glass which comes in contact with them, because no reaction zone appears between the refractories and the glass. Glass that has been melted using such high-zirconia fused refractories therefore contains very few stones and cords.

Glass-borne bubbles resulting from some states or components of high-zirconia fused refractories have largely been eliminated by maintaining the refractories at a high oxidation state or limiting the contents of $Fe_2O_3$ (iron sesquioxide), $TiO_2$ (titanium dioxide) and $CuO$ (cupric oxide) in the refractories.

These improvements have rendered high-zirconia fused refractories suitable for production of very special glasses in addition to glass for general use.

High-zirconia fused refractories consist of monoclinic zirconia crystals and a small amount of glass phase. It is well known that zirconia shows a reversible phase transition between the monoclinic phase and the tetragonal phase at about 1150° C. with an abrupt change in volume.

Crack-free high-zirconia fused refractories can therefore be fabricated by making the glass phase effectively absorb the volume change during the phase transition.

Various measures to attain this goal have been proposed.

A composition containing 1–4 wt % of $SiO_2$ (silica, also called silicon dioxide), with a ratio of $Al_2O_3$ (alumina, also called aluminum oxide) and $SiO_2$ ($Al_2O_3$/$SiO_2$) of 0.5–1, along with a small amount of CaO (calcium oxide) and MgO (magnesium oxide) has been disclosed in JP Laid-open No. 53-121012. Softening the glass phase by adding $P_2O_5$ (phosphorus pentoxide) has been proposed in JP Laid-open No. 56-129675.

Recent popularization of electrically heated melting furnaces for relatively small-scale production or production of glasses with special compositions has made the high electrical resistance of zirconia refractories more important.

For this purpose, JP Laid-open No.62-59576 has proposed glass phase formation with a decreased content of alkali metal oxides, which have relatively high conductivities, along with $P_2O_5$ and $B_2O_3$ (boron sesquioxide) added. JP Laid-open No.63-285173 has disclosed a high-zirconia fused refractory with a high resistance that lacks $Na_2O$ (sodium oxide) but contains $K_2O$ (potassium oxide), $Rb_2O$ (rubidium oxide) or $Cs_2O$, each of which has a large cationic radius, along with alkaline earth metal oxides for glass formation. Furthermore, JP Laid-open No.04-193766 has presented a high-zirconia fused refractory with a high resistance containing alkaline earth metal oxides for glass phase formation.

Another requirement of this kind of refractory is to improve resistance to heating cycles.

It has been proposed in JP Laid-open No.03-28175 to eliminate $P_2O_5$ from the refractory composition to improve the resistance to heating cycles, because $P_2O_5$ in the glass phase acts as a zircon precursor.

Thus, the principal goals of the numerous improvements in high-zirconia fused refractories have been to provide crack-free products during fabrication, with high electrical resistance and high resistance to heating cycles.

Meanwhile, incidents have been reported in glass melting furnaces employing conventional high-zirconia fused refractories in which corners of the refractories fractured at elevated temperatures after construction of the furnace, or where the inner surface of the refractories partially peeled off in shell-like patterns, during the first heating of the furnace. In a more serious case, high-zirconia fused refractories used as the pavement cracked almost globally and the fragments scattered as if in an explosion.

Although such fracture incidents may be caused by a defective furnace design or improper heating procedures, they have actually been encountered even in well-designed and properly heated furnaces.

By contrast, furnaces using other refractories, such as AZS, corundum, α- β-alumina and mullite refractories, have never experienced such fracture incidents, suggesting that they are specifically associated with high-zirconia fused refractories.

Portions of the refractories fractured in such accidents have little corrosion resistance to molten glass, which may result in various inconveniences including formation of stones, cords and other defects in the molten glass; promoting erosion of the refractories through intrusion of molten glass into the cracks; and involving the inclusion of bubbles in the glass, seriously impairing glass quality. This means that the advantages of high-zirconia fused refractories described above have never been fully realized.

In an attempt to find the causes of such fracture of the refractories, the inventors fabricated high-zirconia fused refractories, as Comparative Examples 1–14, incorporating compositions in line with the conventional proposals cited above, in the same manner as for Examples 1–14 described later, and examined residual stress of their surface, breakage on one-side heating, and crack development under heating cycles. The results are shown in Table 1.

As indicated in Table 1, the refractories having the compositions as shown in JP Laid-open No.56-129675 and JP Laid-open No. 03-28175 (Comparative Examples 1–2 and 3–5, respectively) show no cracks immediately after fabrication, but had compressive stress higher than 50 Mpa on their surface as residual stress. The refractories having the compositions as shown in JP Laid-open No.63-285173 and JP Laid-open No.04-193766 (Comparative Examples 6–7 and 8–11, respectively) show no cracks immediately after fabrication, but had tensile stress higher than 80 Mpa on their surface as residual stress. All of the refractories fabricated according to Comparative Examples 1–11 showed fracture on one-side heating.

The refractories having the compositions as shown in JP Laid-open No.62-59576 (Comparative Examples 12 and 13)

had a small residual stress and no fracture on one-side heating, but developed cracks under heating cycles.

Other fused refractories such as AZS, corundum, α-β-alumina and mullite refractories show tensile stress on their surface as residual stress, whose values, however, did not exceed 50 MPa even for the AZS refractories containing 34 wt % of $ZrO_2$, which had the highest residual tensile stress. In addition, none of these refractories were fractured by one-side heating.

These comparisons of Comparative Examples 1–14 with refractories of other types clearly indicate that fracture on one-side heating depends on the type and level of residual stress.

The residual stress in the refractories develops during the slow cooling after casting in the manufacturing process, and therefore is considered to be highly dependent on the mold employed and the cooling rate.

However, adjustment of the type of the mold and the cooling rate is not sufficient as the controlling variables for the type and level of residual stress. For example, conventional high-zirconia fused refractories as described above, fabricated by using molds of the same type at the same cooling rate, may have either residual tensile or compressive stress as residual stress. The direction of residual stress remains uncontrolled, due to the presence of the two kinds of high-zirconia fused refractories having respectively such reverse types of residual stress.

Even if control of residual stress successfully prevents fracture of the refractories on one-side heating, the problem will persist if cracks develop under heating cycles as shown in Comparative Examples 12–14.

Considering and experimenting with these problems, the inventors have found that the adjustment of the composition of the glass phase in the high-zirconia fused refractories is an effective primary factor to control their residual stress through changing the coefficient of thermal expansion.

According to the inventors' measurements, general conventional high-zirconia fused refractories have bending strengths of 90–130 MPa at room temperature. This means that the refractories will crack and become fractured when their compressive or tensile stress that develops in them exceeds the range indicated above.

In actual use in a glass melting furnace, the high-zirconia fused refractories will expand with the elevation of the temperature of their surface to be heated, and accordingly compressive stress, which is opposite to the expansion, will act on the surface of the refractories. If the residual stress of the surface of the refractory is compressive, the stress increases by the additional compressive stress due to thermal expansion during furnace heating. The resultant force of the compressive stress through heating and the residual stress will act on their surface, and accordingly the refractories tend to develop fracture at the elevation of temperatures even if the original residual stress is relatively low. On the contrary, if the residual stress is tensile, it is counteracted by the compressive stress that develops on heating, thus making damage less likely even if the original stress is relatively high.

Therefore, to prevent surface cracks on one-side heating, the refractories should have as residual stress either compressive stress lower than that in the refractories described in JP Laid-open No.56-129675 and JP Laid-open No.03-28175 cited above, or tensile stress somewhat lower than that in the refractories described in JP Laid-open No.63-285173 and JP Laid-open No.04-193766 cited above.

AZS, corundum, α- β-alumina and mullite refractories are not damaged, as stated above, on the first heating of a new glass melting furnace, because the residual stress in the respective refractories does not exceed their mechanical strength.

All the fracture incidents specifically associated with high-zirconia fused refractories, as described earlier, occurred at 400°–600° C., i.e. at a relatively low temperature before the glass phase in the refractories softened.

This indicates clearly the importance of the nature of the glass phase forming component in preventing damage to the refractories.

It is also desired that the refractories have a high electrical resistance, no defects such as cracks during fabrication and no cracks under heating cycles. Therefore, the chemical composition of the glass phase should be seriously deliberated.

As for electrical resistance, JP Laid-open No.62-59576 cited above has disclosed high-zirconia fused refractories that dispense with alkali metal oxides such as $Na_2O$ and $K_2O$ to attain a high electrical resistance. In the refractories, however, mutual diffusion of ions occurs in contact with molten glass, which leads to the replacement of the glass phase component in the refractories component of the molten glass, lowering the electrical resistance of the refractories.

To counter this phenomenon, JP Laid-open No.63-285173 cited above has proposed the addition of $K_2O$, BaO or SrO, which are alkali or alkaline earth metal oxides that are rarely substituted due to their large cationic radii. However, addition of these components result in a high tensile stress as residual stress in the refractories, which tends to cause fracture on one-side heating of the refractories.

Various modifications have been conventionally proposed concerning the glass phase composition of high-zirconia fused refractories, as exemplified in Comparative Examples 1–11, to prevent cracks during fabrication. This has been done without being verified, by one-side heating which is representative of the circumstances that prevail in the first heating of a new glass furnace.

For example, JP Laid-open No.03-28175 cited above reports heating cycle resistance tests using very small specimens placed in a furnace. Since the whole of each small specimen is placed in the furnace, the temperature is fairly uniform throughout, which is a very different condition from that in actual use of the refractories, in which the inner side of the refractory has a temperature different from the outer side during the elevation of the temperature of the furnace. In other words, the temperatures of the inner side of the refractories will never be identical with that of the outer side of them during the elevation of the temperature.

SUMMARY OF THE INVENTION

The object of the present invention is to prevent, by controlling residual stress, fracture of high-zirconia fused refractories on one-side heating which is a problem specifically associated with this kind of refractories, and to improve the resistance of such refractories to heating cycles, as well as to increase electrical resistance.

Based on various investigations directed toward meeting these requirements, the invention provides high-zirconia fused refractories consisting essentially of 85–96 wt % of $ZrO_2$, 3–8 wt % of $SiO_2$, 0.1–2 wt % of $Al_2O_3$, 0.05–3 wt % of $B_2O_3$, 0.05–3 wt % of BaO, SrO and MgO in total, 0.05 wt % or more of $Na_2O$, 0.05–0.6 wt % of $Na_2O$ and $K_2O$ in total, and 0.3 wt % or less of $Fe_2O_3$ and $TiO_2$ in total, and not substantially containing $P_2O_5$ or CuO.

The invention also provides high-zirconia fused refractories consisting essentially of 90–95 wt % of $ZrO_2$, 3–5.5 wt % $SiO_2$, 0.1–1.5 wt % of $Al_2O_3$, 0.05–2 wt % $B_2O_3$, 0.05–2 wt % BaO, SrO and MgO in total, 0.05 wt % or more of $Na_2O$, 0.05–0.3 wt % of $Na_2O$ and $K_2O$ in total, and 0.3 wt % or less of $Fe_2O_3$ and $TiO_2$ in total, and not substantially containing $P_2O_5$ or CuO.

In the present invention, "containing substantially no" means that a specific substance is not added intentionally, thus permitting existence of, for example, less than 0.05 wt % of that substance within the scope of the invention.

The high-zirconia fused refractories according to the invention preferably have, as residual stress residing in their surface, tensile stress of 80 MPa or less or compressive stress of 50 MPa or less.

The refractories according to the invention also preferably contain 0.05–0.55 wt % of $K_2O$ and exhibit electrical resistance of 150 Ω cm or higher.

The $ZrO_2$ content of the refractories according to the invention is 85–96 wt %, and preferably 90–95 wt %. $ZrO_2$ content higher than 96 wt % does not offer crack-free refractories, while $ZrO_2$ content lower than 85 wt % leads to poor resistance to molten glass.

The $SiO_2$ content of such refractories is 3–8 wt %, or preferably 3–5.5 wt %. $SiO_2$ is indispensable for glass phase formation. The glass phase cannot be formed at a content of less than 3 wt %, while poor resistance to molten glass may be expected at a content of higher than 8 wt %.

The $Al_2O_3$ content of such refractories is 0.1–2 wt %, and preferably 0.1–1.5 wt %. $Al_2O_3$ reduces the tensile stress of the residual stress and improves the flowability of the melt. Such effects are not obtained at a content lower than 0.1 wt %, while a content of over 2 wt % results in high compressive stress of the residual stress and instability of the glass phase, thus rendering the product prone to fracture.

The $B_2O_3$ content of such refractories is 0.05–3 wt %, and preferably 0.05–2 wt %. $B_2O_3$ is indispensable for forming borosilicate glass, and plays an important role in the present invention, e.g. in suppressing cracks during fabrication. Such effects are not obtained at a content of less than 0.05 wt %, while a content of higher than 3 wt % increases the tensile stress of the residual stress. Furthermore, excessive addition of $B_2O_3$ renders the refractories hygroscopic, leading to formation of the efflorescent $H_3BO_4$, which has adverse effect on the structure of the refractory.

Addition of alkali metal oxides such as $Na_2O$ and $K_2O$ according to the invention stabilizes the borosilicate glass formed and thus prevents this phenomenon. Such borosilicate glass exists stably as glass phase. $Na_2O$ and $K_2O$ are essential to forming of $B_2O_3$ into a highly stable borosilicate glass.

The total content of BaO (barium oxide). SrO (strontium oxide) and MgO in the refractories according to the invention is 0.05–3 wt %. preferably 0.05–2 wt %. These components are very important in forming a stable glass phase, which cannot be formed at a content of lower than 0.05 wt %.

The glass phase-forming alkaline earth metal oxides Bao, Sro and MgO scarcely vaporize when melted. Since their concentrations can thus be adjusted readily, they are suitable for forming a stable glass phase. When added to a high-zirconia fused refractory, they do not cause zircon or similar crystals to form, in contrast to $P_2O_5$, even if a part of the alkali metals vaporizes from the high-zirconia fused refractories to change the glass phase composition. They do not reduce the heating cycle resistance of the refractory.

Glasses for electronic applications, including those for photomasks, cathode ray tubes and liquid crystal displays, often contain BaO, SrO or MgO. When the high-zirconia fused refractories according to the invention are employed in a melting furnace for such electronic glasses, the fact that the same components are shared by the molten glass and the refractories prevents mutual diffusion of the corresponding ions, thus retarding erosion of the refractories.

Thus, BaO, SrO and/or MgO are essential components of the refractories according to the invention, which, however, increase the tensile stress or the residual stress at a total content greater than 3 wt %, in the same manner as $B_2O_3$.

At least one of BaO, SrO and MgO suffices for the refractories according to the invention, and any combination of two or more of them may also be used. However, BaO is the preferred component for its general properties and stability in the glass phase. Therefore, the refractory should contain either BaO alone or a combination of BaO-SrO, BaO-MgO or BaO-SrO-MgO.

The $Na_2O$ content of the refractories according to the invention is higher than 0.05 wt %, the total content of $Na_2O$ and $K_2O$ being 0.05–0.6 wt %, and preferably 0.05–0.3 wt %. In other words, the refractories may contain $Na_2O$ either alone or in combination with $K_2O$. This is to reduce the tensile stress of the residual stress. A total content of $Na_2O$ and $K_2O$ higher than 0.6 wt % will increase the compressive component of the residual stress.

The tensile component of the residual stress is also reduced by $Al_2O_3$ as described earlier, which alone, however, cannot sufficiently relax the tensile stress generated by $B_2O_3$ and alkaline earth metal oxides due to the content limit discussed above. This again necessitates $Na_2O$ and $K_2O$ as essential components.

Comparative Examples 6 and 7 shows that addition of $K_2O$ only (without $Na_2O$) is undesirable because of its ineffectiveness in reducing the tensile stress as the residual stress, resulting in fracture on one-side heating and low resistance to heating cycles.

For a high electrical resistance, it is desirable for the refractories to contain 0.05–0.55 wt % each of $Na_2O$ and $K_2O$ (i.e. 0.05 wt % or more each of $Na_2O$ and $K_2O$), the best result being obtained when $Na_2O$ and $K_2O$ are of the same molarity.

Thus, the invention provides effective prevention of fractures on one side heating of the refractories along with a high electrical resistance by addition of $Na_2O$ at least.

CuO and $P_2O_5$ have been effectively used in conventional high-zirconia fused refractories that do not contain $B_2O_3$, so as to eliminate fractures during fabrication by reducing the tensile stress, increasing the compressive stress and softening the glass phase. However, in the presence of $B_2O_3$, these compounds tend to form a low melting point glass, and accordingly to drastically reduce the chemical durability. Furthermore, $P_2O_5$ tends to lower the heating cycle resistance, and to limit the bulk density of the refractories through its hygroscopicity. CuO is effective in reducing cracks but stains the molten glass, and therefore is restricted in refractory use.

For these reasons, the present invention intentionally avoids addition of CuO and $P_2O_5$, i.e. proposes refractories that do not substantially contain those substances.

$TiO_2$ and $Fe_2O_3$ may be present as impurities, but their total concentration should not exceed 0.3 wt % because they may encourage cracks to develop in the refractories.

The surface residual stress in the refractories according to the invention is the tensile stress of 80 Mpa or less, and preferably 60 MPa or less; or the compressive stress of 50 Mpa or less, and preferably 30 MPa or less. This endows the refractories with favorable characteristics, including prevention of fracturing by one-side heating or heating cycles.

The high-zirconia fused refractories according to the invention thus consist essentially of 85–96 wt % of $ZrO_2$, 3–8 wt % of $SiO_2$, 0.1–2 wt % of $Al_2O_3$, 0.05–3 wt % of $B_2O_3$, 0.05–3 wt % of BaO, SrO and MgO in total, 0.05 wt % or more of $Na_2O$, 0.05–0.6 wt % of $Na_2O$ and $K_2O$ in total, and 0.3 wt % or less of $Fe_2O_3$ and $TiO_2$ in total, and not substantially containing $P_2O_5$ or CuO, which may be freed from fracturing on one-side heating and under heating cycles by controlling the residual stress on the surface.

These characteristics eliminate completely damages during the first heating of a furnace employing those refractories, because they enhance the resistance of the refractories to damages that may occur with conventional high corrosion-resisting high zirconia fused refractories particularly at the lower temperatures of such heating, including cracks, corner chipping, peeling, explosive scattering or other phenomena of thermal spalling.

Another advantage of the refractories according to the invention is the absence of glass staining when applied to a glass melting furnace.

Based on further various investigations, the invention provides other high-zirconia fused refractories consisting essentially of 85–96 wt % of $ZrO_2$, 3–8 wt % of $SiO_2$, 0.1–2 wt % of $Al_2O_3$, 0.05–3 wt % of $B_2O_3$, 0.05–3 wt % of BaO, SrO and MgO in total, 0.05 wt % or more of $Na_2O$, 0.05–0.6 wt % of $Na_2O$ and $K_2O$ in total, and 0.3 wt % or less of $Fe_2O_3$ and $TiO_2$ in total, 0.2 wt % or less of $P_2O_5$ and not substantially containing CuO. In this mode of the invention, $P_2O_5$ is contained unlike in the above-stated modes of the present invention.

It is preferable that the high-zirconia fused refractories consist essentially of 90–95 wt % $ZrO_2$, 3–5.5 wt % $SiO_2$, 0.1–1.5 wt % of $Al_2O_3$, 0.05–2 wt % $B_2O_3$, 0.05–2 wt % BaO, SrO and MgO in total, 0.05 wt % or more of $Na_2O$, 0.05–0.3 wt % of $Na_2O$ and $K_2O$ in total, and 0.3 wt % or less of $Fe_2O_3$ and $TiO_2$ in total, 0.1 wt % or less of $P_2O_5$.

The high-zirconia fused refractories according to a mode of the invention preferably have, as residual stress residing in their surface, tensile stress of 80 MPa or less or compressive stress of 50 MPa or less.

The refractories according to the invention preferably contain 0.05 wt % or more of $K_2O$ and have electrical resistance of 150 Ω cm or higher. The glass phase of the refractories preferably has a thermal expansion coefficient of $30 \times 10^{-7}$/°C. to $80 \times 10^{-7}$/°C., and preferably $40 \times 10^{-7}$/°C. to $70 \times 10^{-7}$/°C. Such a scope of the thermal expansion coefficient is very important in particular when the refractories are first heated in a furnace. At the first heating, the conventional refractories are cracked due to residual stress therein.

BRIEF DESCRIPTION OF THE DRAWINGS

FIG. 1 is a schematic view showing how to measure residual stress.

EMBODIMENTS OF THE INVENTION

The invention will be explained referring to some preferable embodiments for the high-zirconia fused refractories.

In some examples, the crack-free high-zirconia fused refractories consist essentially of 85–96 wt % of $ZrO_2$, 3–8 wt % of $SiO_2$, 0.1–2 wt % of $Al_2O_3$, 0.05–3 wt % of $B_2O_3$, 0.05–3 wt % of BaO, SrO and MgO in total, 0.05 wt % or more of $Na_2O$, 0.05–0.6 wt % of $Na_2O$ and $K_2O$ in total, and 0.3 wt % or less of $Fe_2O_3$ and $TiO_2$ in total, and do not substantially contain $P_2O_5$ or CuO.

In some other examples, the crack-free high-zirconia fused refractories consist essentially of 90–95 wt % of $ZrO_2$, 3–5.5 wt % of $SiO_2$, 0.1–1.5 wt % of $Al_2O_3$, 0.05–2 wt % of $B_2O_3$, 0.05–2 wt % of BaO, SrO and MgO in total, 0.05 wt % or more of $Na_2O$, 0.05–0.3 wt % of $Na_2O$ and $K_2O$ in total, and 0.3 wt % or less of $Fe_2O_3$ and $TiO_2$ in total, and do not substantially contain $P_2O_5$ or CuO.

Another examples is substantially the same as those examples except that $P_2O_5$ is intentionally added. For example, 0.2 Wt % or less of $P_2O_5$ is contained.

In addition, the refractories should preferably have tensile stress of 80 MPa or less, or compressive stress of 50 MPa or less, as the residual stress on the surface.

Moreover, the refractories preferably contain 0.05 wt % or more of $K_2O$ and have electrical resistance of 150 Ω cm or more. The glass phase thereof has a thermal expansion coefficient of $30 \times 10^{-7}$/°C. to $80 \times 10^{-7}$/°C., and preferably $40 \times 10^{-7}$/°C. to $70 \times 10^{-7}$/°C. Thus, no crack or peeling takes place at a very high temperature elevating rate such as 0.2° C./min.

EXAMPLES 1–14

Examples 1–14 according to the invention will be described below.

Table 2 shows the components and their contents of the high-zirconia fused refractories of each Example. The dashes in the Table represent a concentration less than 0.05 wt %, i.e. that the component is substantially absent, while ≦0.3 signifies a content of 0.3 wt % or less. The total content is shown for $Fe_2O_3$ and $TiO_2$.

The refractories have been fabricated in the following manner.

Artificial zirconia obtained by desiliconizing zircon served as a starting material, to which specified amounts of $Al_2O_3$, $SiO_2$, $B_2O_3$, $Na_2O$, $K_2O$, BaO, SrO, MgO and the like were added in powder form. They were then mixed, fused in an electric arc furnace, cast into a graphite mold with 100×150×350 mm in inner dimensions, submerged in Bayer alumina powder, and slowly cooled to room temperature. This process was employed for the fabrication of all the high-zirconia fused refractories shown in Table 2 as Examples 1–14.

Examples were tested for damages on one-side heating in the following manner. Three pieces of high-zirconia fused refractories, free from cavities, 100×150×350 mm in size, were placed on refractories as specimens, surrounded by heat insulator blocks, and heated by a heater placed above themselves. The specimens were so arranged that the 150× 350 mm faces were heated. The temperature of the heated surfaces rose to 1000° C. at a rate of 0.1° C./min. The specimens were examined for cracks during this one-side heating. Results are shown in Table 2.

The residual stress (also called residual strain) of each Example was measured as shown in FIG. 1. The three strain gauges 1,2,3 are arranged around each holes 4 formed on the surface with a size of 100×150×350 mm of a cavity-free specimen. The gages are separate from each other by 45° about the center of each hole 4. R=12.75 mm, r1=17.5 mm, r2=22.5 mm, and L=5.0 mm. The detail of the gages and the measing method will be explained in connection with Tables 3–5. Results are shown in Table 2. The plus sign (+) indicates the maximum compressive stress, while the minus sign (−) indicates the maximum tensile stress. As stated earlier, fracture at elevated temperatures, characteristic of high-zirconia fused refractories, is closely related to the residual stress on the surface.

Table 2 demonstrates that these refractories do not fracture on one-side heating due to their compressive stresses less than 50 MPa or the tensile stresses of less than 80 MPa.

The resistance of the refractories to heating cycles was tested using specimens of 30×40×40 mm in size cut from each Example. These were heated to 1250° C. and held for 60 min, and further held at 800° C. for 60 min. This cycle was repeated 20 times, after which the specimens were examined for cracks. Results are shown in Table 2.

Finally the electrical resistance of each Example was measured at 1500° C. Results are shown in FIG. 2. The dashes indicate that the resistance was not measured because it was readily estimated from the composition.

The results of these measurements lead to the following conclusions.

High-zirconia fused refractories having chemical compositions within the range according with the present invention and compressive stresses of less than 50 MPa or tensile stresses lower than 80 MPa have favorable characteristics and are crack-free as shown in Examples 1–14. Such refractories develop no crack on one-side heating or under heating cycles.

This performance is further improved if the residual stress is a compressive stress of less than 30 MPa or a tensile stress of less than 50 MPa.

Moreover, the simultaneous addition of $Na_2O$ and $K_2O$ is effective in increasing the electrical resistance.

Examples 1, 2, 4 and 8 did not show fracture on one-side heating in spite of an $Na_2O$ content higher than the other Examples. This is attributed to the compressive of component the residual stress reduced due to the addition of $B_2O_3$, BaO, SrO and MgO that counteract the effects of $Na_2O$.

Comparisons of Examples 1–14 with Comparative Examples 1–14

Tables 1 and 2 allow comparisons of Examples 1–14 with Comparative Examples 1–14.

Comparative Examples 1 and 2 differ from Examples 1–14 in that they do not contain $B_2O_3$, BaO, SrO or MgO but do contain $P_2O_5$. Here $Na_2O$, with the additional cooperation of $P_2O_5$, produces a high compressive stress residing as the residual stress, resulting in corner chipping and partial face peeling on one-side heating.

Comparative Examples 3, 4, and 5 differ from Examples 1–14 in that they do not contain $B_2O_3$, BaO, SrO or MgO. The principal components of the glass phase are then $Na_2O$, $Al_2O_3$ and $SiO_2$, and the compressive stress residing as the residual stress was so high that the specimens fractured on one-side heating. In particular, Example 3 fractured over a wide area and fragments scattered at a temperature of approximately 500° C.

Comparative Examples 6 and 7 differ from Examples 1–14 in that they do not contain $Na_2O$, and contain only $K_2O$ as an alkali metal oxide. The tensile stresses residing as the residual stress was more than 80 MPa, leading to crack development on one-side heating as well as under heating cycles.

Comparative Examples 8–11 differ from Examples 1–14 in that they do not contain $Na_2O$, $K_2O$ or any other alkali metal oxide, leading to a considerably higher residual tensile stress. On one-side heating, these refractories developed a single longitudinal crack, unlike in the case of a high residual compressive stress where fragments scattered.

Comparative Examples 8–11 have high resistance because of the absence of alkali metal oxides.

On the contrary, according to the invention, the addition of an equimolar amount of $Na_2O$ and $K_2O$ endows the refractories with a high electrical resistance while preventing fracture on one-side heating. For example, an equimolar amount of $Na_2O$ and $K_2O$ along with $B_2O_3$ and BaO, an alkaline earth metal oxide with a large cationic radius, in Example 9 has resulted in refractories with a high electrical resistance.

Comparative Examples 12 and 13 differ from Examples 1–14 in that they do not contain BaO, SrO or MgO but do contain $P_2O_5$. Although this kept low the residual tensile stress residing as the residual stress low, the presence of $P_2O_5$ caused fairly thick layers to peel off from the surface. This was because of a difference in the coefficient of thermal expansion between the surface and the inside of the specimens due to vaporization of $P_2O_5$ from the glass phase near the surface.

Comparative Example 14 differs from Examples 1–14 in that it does not contain $Na_2O$, and contains only $K_2O$ as alkali metal oxide. The residual compressive stress was low and no fracturing was observed on one-side heating. However, the absence of $Na_2O$ resulted in a low resistance to heating cycles. $K_2O$ should therefore be added along with $Na_2O$.

The Examples described above should not be interpreted as limiting the scope of the invention.

For example, the surface of high-zirconia fused refractories may be polished or cut, by which the residual stress is partially removed, though this does not lead to any significant reduction of the residual stress.

EXAMPLES 15–35

Examples 15–35 according to the invention will be described below.

Tables 3–5 show the components and their contents of the high-zirconia fused refractories for each of Examples 15–38. The dashes in the Tables indicate a concentration of less than 0.05 wt %, i.e. that the component is substantially absent, while "≤0.3" indicates the content of 0.3 wt % or less. The total content is shown for $Fe_2O_3$ and $TiO_2$.

The refractories have been fabricated in the following manner.

Artificial zirconia obtained by desiliconizing zircon served as a starting material, to which specified amounts of $Al_2O_3$, $SiO_2$, $B_2O_3$, $Na_2O$, $K_2O$, BaO, SrO, MgO and the like were added in powder form. These were then mixed, fused in an electric arc furnace, cast into a graphite mold having 100×150×350 mm in inner dimensions, submerged in Bayer alumina powder, and slowly cooled to room temperature. A feeding head having 140×235×200 mm in inner dimensions is placed over the graphite mold and joined thereto. This process was employed for the fabrication of all the high-zirconia fused refractories shown in Tables 3–5 as Examples 15–35.

Examples 15–35 were tested as to one-side heating, heating cycle, residual stress and thermal expansion coefficient. Three pieces of high-zirconia fused refractories free from caviting, 100×150×350 mm in size, were placed on refractories as specimens, surrounded by heat insulator blocks, and heated by a heater placed above them. The specimens were so arranged that the 150 mm×350-mm faces were heated. The temperature of the heated surfaces rose up to 1000° C. at two rates of 0.1 and 0.2° C./min. The specimens were examined for cracks during this one-side heating. Results are shown in Tables 3–5.

The residual stress (also called residual strain) in the specimen of each Example No. 15 to No. 35 was measured by the above-stated measuring method referring to FIG. 1. Three strain gauges 1–3 are attached via epoxy resin on the specimen which is grained by about 1 mm depth and has holes formed on the 150 mm×350 mm surface. Each hole 4 has a diameter of 25 mm. The employed measuring method is SOETE, VANCROMBURGGE explained in the book "Generation and Action of Residual Stress" by Yoneya Shigeru, Yohkendo Publishing Co., Ltd. The employed strain gages are the strain gage "KFC-5-C1-11" of Kyowa Dengyo Co., Ltd. The employed measuring apparatus is a digital multi-point static strain measuring apparatus "DPU-100B" produced by Minebea Co., Ltd. Results are shown in Tables 3–5. The plus sign (+) indicates the maximum compressive stress, while the minus sign (−) indicates the maximum tensile stress.

The thermal expansion coefficient of the glass phase was measured in the following manner: The chemical contents of the components of the glass phase in the refractories were analyzed by EPMA which is an analyzer. The measuring method is based on JIS R 3102. The test results are shown in Tables 3–5.

The resistance of the refractories to heating cycles was tested using specimens 30×40×40 mm in size cut from each Example, which were heated to 1250° C. in an electric furnace and held for 60 min, and further held at 800° C. for 60 min. This cycle was repeated 20 times, after which the specimens were examined for cracks. Results are shown in Tables 3–5.

Finally the electrical resistance of each Example was measured at 1500° C. Results are shown in Tables 3–5.

The results of these measurements lead to the following conclusions.

High-zirconia fused refractories according to Examples No. 15 to No. 35 of the present invention have compressive stresses less than 50 MPa or tensile stresses lower than 80 MPa.

The thermal expansion cofficient of each glass phase thereof is within $30 \times 10^{-7}/°C$. to $80 \times 10^{-7}/°C$. Thus, no peeling occurs.

In particular, the performance was further improved in Examples Nos. 15,19,20,21,24–26,28–30,32,34,35 in which the residual stress was a compressive stress less than 30 MPa or a tensile stress less than 50 MPa. No peeling took place in case of a very high temperature-increasing speed of 0.2° C./min.

In case the heating up speed is 0.2° C./m, in Examples Nos. 16–18,22,23,27,31,33, some minor fracturing occurs, but no peeling occurs. In particular, Examples Nos. 21 and 28 include 0.1% of $P_2O_5$, and Example 27 includes 0.2% of $P_2O_5$, but no fracturing due to heating cycles occurs. These effects can be obtained because BaO, SrO, MgO and so on are contained in the glass phase.

Where the chemical compositions are within such a range, the electric resistance at 1500° C. is 120 Ω·cm or more. In Example Nos.15,17,19,20,22–27,30,32,35, the total of $Na_2O$ and $K_2O$ is between 0.1 and 0.5, and the electric resistance is 150 Ω·cm or more.

In Examples Nos.15,19–21,24–26,28–30,32,34,35, the thermal expansion coefficient of the glass phase is from $40 \times 10^{-7}/°C$. to $70 \times 10^{-7}/°C$. so that no peeling occurs even if the heating speed is 0.2° C./min.

In comparison with Examples 15 to 35, the Comparative Examples 15 to 28 will be explained.

In Comparative Examples 15 to 28, some fracturing on one-side heating, fracture due to heating cycles and/or peeling occurs as shown in Tables 3 to 5.

TABLE 1

| Comparative Example | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Composition (in wt %) | $ZrO_2$ | 93.4 | 94.5 | 93.6 | 95.4 | 96.2 | 92.0 | 90.8 | 92.1 | 92.3 | 93.1 | 94.0 | 92.9 | 94.8 | 92.2 |
| | $SiO_2$ | 3.8 | 2.6 | 4.5 | 3.5 | 2.6 | 6.1 | 6.2 | 3.7 | 4.1 | 3.4 | 3.3 | 4.8 | 3.6 | 3.6 |
| | $Al_2O_3$ | 1.5 | 2.0 | 0.8 | 0.6 | 0.4 | 0.1 | 0.1 | 1.2 | 1.4 | 1.2 | 1.0 | 0.8 | 0.7 | 0.6 |
| | $B_2O_3$ | — | — | — | — | — | 1.0 | 1.5 | 0.5 | — | 0.4 | 0.2 | 1.1 | 0.5 | 1.2 |
| | BaO | — | — | — | — | — | 0.25 | — | 0.6 | 1.1 | 0.2 | 0.6 | — | — | — |
| | SrO | — | — | — | — | — | — | 0.5 | — | 0.8 | 0.1 | 0.2 | — | — | 1.1 |
| | MgO | — | — | — | — | — | — | — | — | — | — | — | — | — | 0.3 |
| | CaO | — | — | — | — | — | — | — | 0.3 | — | 0.1 | 0.2 | — | — | — |
| | ZnO | — | — | — | — | — | — | — | 1.6 | — | 0.5 | — | — | — | — |
| | $Na_2O$ | 0.8 | 0.2 | 0.7 | 0.4 | 0.2 | — | — | — | — | — | — | 0.06 | 0.05 | — |
| | $K_2O$ | — | — | — | — | — | 0.25 | 0.5 | — | — | — | — | | | 0.5 |
| | $P_2O_5$ | 0.5 | 0.3 | — | — | — | — | — | — | — | — | — | 0.5 | 0.2 | — |
| | $Fe_2O_3$ $TiO_2$ | ≦0.1 | ≦0.1 | ≦0.3 | ≦0.3 | ≦0.3 | ≦0.3 | ≦0.3 | ≦0.1 | ≦0.1 | ≦0.1 | ≦0.1 | ≦0.1 | ≦0.1 | ≦0.3 |
| Residual stress (in MPa) | | +76 | +56 | +72 | +64 | +58 | −85 | −89 | −91 | −83 | −90 | −86 | −69 | −75 | +36 |
| Fracture on one-side heating | | Yes | Yes | Yes | Yes | Yes | Yes | Yes | Yes | Yes | Yes | Yes | No | No | No |
| Fracture due to heat cycles | | Yes | Yes | No | No | No | Yes | Yes | No | No | No | No | Yes | Yes | Yes |
| Electrical resistance at 1500° C. (in Ω cm) | | — | — | — | — | — | 180 | — | 200 | 140 | 190 | 220 | 120 | — | — |

TABLE 2

| Example | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Composition (in wt %) | $ZrO_2$ | 86.1 | 91.3 | 91.6 | 92.4 | 92.6 | 92.8 | 93.2 | 93.4 | 93.8 | 94.1 | 94.2 | 94.4 | 94.8 | 95.1 |
| | $SiO_2$ | 6.7 | 4.6 | 5.2 | 4.6 | 3.5 | 4.4 | 3.1 | 4.1 | 4.3 | 3.6 | 3.4 | 3.2 | 3.3 | 3.6 |
| | $Al_2O_3$ | 1.9 | 1.2 | 0.8 | 0.6 | 0.8 | 0.8 | 0.6 | 0.7 | 0.3 | 0.4 | 0.6 | 0.5 | 0.2 | 0.1 |
| | $B_2O_3$ | 1.8 | 1.5 | 1.1 | 1.1 | 1.0 | 1.0 | 0.1 | 1.1 | 1.2 | 1.3 | 1.0 | 0.8 | 1.2 | 0.6 |
| | BaO | 1.5 | 0.6 | 0.5 | 0.5 | 0.6 | 0.5 | 1.5 | — | 0.05 | — | — | — | 0.05 | 0.1 |
| | SrO | 0.6 | — | 0.2 | — | — | — | 0.8 | — | — | — | — | 0.5 | — | — |
| | MgO | 0.8 | 0.1 | — | — | — | 0.1 | 0.5 | 0.05 | — | 0.1 | 0.3 | — | — | 0.1 |
| | CaO | — | — | — | — | — | — | — | — | — | — | — | — | — | — |
| | ZnO | — | — | — | — | — | — | — | — | — | — | — | — | — | — |
| | $Na_2O$ | 0.5 | 0.5 | 0.3 | 0.5 | 0.1 | 0.05 | 0.1 | 0.4 | 0.05 | 0.1 | 0.1 | 0.15 | 0.05 | 0.05 |
| | $K_2O$ | — | — | 0.2 | — | 0.1 | 0.05 | — | — | 0.08 | 0.1 | — | 0.2 | 0.15 | — |
| | $P_2O_5$ | — | — | — | — | — | — | — | — | — | — | — | — | — | — |
| | $Fe_2O_3$ $TiO_2$ | ≦0.3 | ≦0.3 | ≦0.3 | ≦0.3 | ≦0.3 | ≦0.3 | ≦0.3 | ≦0.3 | ≦0.3 | ≦0.3 | ≦0.3 | ≦0.3 | ≦0.3 | ≦0.3 |
| Residual stress (in MPa) | | +28 | +38 | +42 | +47 | +15 | −16 | −6 | +39 | −73 | +11 | −9 | +27 | +31 | −53 |
| Fracture on one-side heating | | No | No | No | No | No | No | No | No | No | No | No | No | No | No |
| Fracture due to heat cycles | | No | No | No | No | No | No | No | No | No | No | No | No | No | No |
| Electrical resistance at 1500° C. (in Ω cm) | | — | 120 | — | — | 190 | 230 | 130 | — | 210 | 180 | — | 180 | — | 140 |

TABLE 3

| Example | | 15 | 16 | 17 | 18 | 19 | 20 | 21 |
|---|---|---|---|---|---|---|---|---|
| Composition (in wt %) | $ZrO_2$ | 86.1 | 91.2 | 91.6 | 92.5 | 92.6 | 92.8 | 93.2 |
| | $SiO_2$ | 6.6 | 4.6 | 5.2 | 4.6 | 3.2 | 4.3 | 3.1 |
| | $Al_2O_3$ | 2.0 | 1.2 | 0.8 | 0.6 | 0.8 | 0.8 | 0.6 |
| | $B_2O_3$ | 2.0 | 1.5 | 1.1 | 1.0 | 1.0 | 1.0 | 0.1 |
| | BaO | 1.9 | 0.6 | 0.5 | 0.5 | 0.6 | 0.5 | 1.5 |
| | SrO | 0.3 | — | 0.2 | — | — | — | 0.8 |
| | MgO | 0.4 | 0.2 | — | — | — | 0.2 | 0.5 |
| | CaO | — | — | — | — | — | — | — |
| | ZnO | — | — | — | — | 0.3 | — | — |
| | $Na_2O$ | 0.2 | 0.5 | 0.3 | 0.5 | 0.1 | 0.05 | 0.1 |
| | $K_2O$ | — | — | 0.2 | — | 0.1 | 0.05 | — |
| | $P_2O_5$ | — | — | — | — | — | — | 0.1 |
| | $Fe_2O_3$ $TiO_2$ | ≦0.3 | ≦0.3 | ≦0.3 | ≦0.3 | ≦0.3 | ≦0.3 | ≦0.3 |
| Residual stress (in MPa) | | −19 | +39 | +42 | +32 | +15 | −12 | −1 |
| Peeling resistance in one-side heating (0.1° C./min. temperature rise) | | ⊙ | ⊙ | ⊙ | ⊙ | ⊙ | ⊙ | ⊙ |
| Peeling resistance in one-side heating (0.2° C./min. temperature rise) | | ⊙ | o | o | o | ⊙ | ⊙ | ⊙ |
| Crack resistance in heat cycle | | ⊙ | ⊙ | ⊙ | ⊙ | ⊙ | ⊙ | ⊙ |
| Electrical resistance at 1500° C. (Ω · cm) | | 150 | 120 | 150 | 140 | 190 | 230 | 130 |
| Thermal expansion coefficient of glass phase (×$10^{-7}$/°C.) | | 50 | 76 | 77 | 72 | 67 | 56 | 61 |

One-side heating test
⊙ No cracking and no peeling occured.
o Small cracking occured and peeling occured.
x No peeling occured.
Heating cycle test
⊙ No cracking occured.
x Cracking occured.

TABLE 4

| Example | | 22 | 23 | 24 | 25 | 26 | 27 | 28 |
|---|---|---|---|---|---|---|---|---|
| Composition (in wt %) | $ZrO_2$ | 93.4 | 93.8 | 94.1 | 94.2 | 94.4 | 94.8 | 95.1 |
| | $SiO_2$ | 4.1 | 4.3 | 3.6 | 3.4 | 3.2 | 3.3 | 3.5 |
| | $Al_2O_3$ | 0.7 | 0.3 | 0.4 | 0.6 | 0.5 | 0.2 | 0.1 |
| | $B_2O_3$ | 1.1 | 1.2 | 1.3 | 0.9 | 0.8 | 1.2 | 0.6 |
| | BaO | — | 0.05 | — | — | — | 0.05 | 0.1 |
| | SrO | — | — | — | — | 0.5 | — | — |
| | MgO | 0.1 | — | 0.2 | 0.3 | — | — | 0.05 |
| | CaO | — | — | — | — | — | — | — |
| | ZnO | — | — | — | — | — | — | 0.1 |
| | $Na_2O$ | 0.4 | 0.05 | 0.1 | 0.1 | 0.15 | 0.05 | 0.05 |
| | $K_2O$ | — | 0.08 | 0.1 | — | 0.2 | 0.15 | — |
| | $P_2O_5$ | — | — | — | — | — | 0.2 | 0.1 |
| | $Fe_2O_3$ $TiO_2$ | ≦0.3 | ≦0.3 | ≦0.3 | ≦0.3 | ≦0.3 | ≦0.3 | ≦0.3 |
| Residual stress (in MPa) | | +39 | −73 | +16 | −7 | +27 | +33 | −48 |
| Peeling resistance in one-side heating (0.1° C./min. temperature rise) | | ⊚ | ⊚ | ⊚ | ⊚ | ⊚ | ⊚ | ⊚ |
| Peeling resistance in one-side heating (0.2° C./min. temperature rise) | | o | o | ⊚ | ⊚ | ⊚ | o | ⊚ |
| Crack resistance in heat cycle | | ⊚ | ⊚ | ⊚ | ⊚ | ⊚ | ⊚ | ⊚ |
| Electrical resistance at 1500° C. (Ω · cm) | | 150 | 210 | 180 | 170 | 180 | 290 | 140 |
| Thermal expansion coefficient of glass phase ($\times 10^{-7}$/°C.) | | 76 | 32 | 67 | 58 | 69 | 73 | 43 |

One-side heating test
⊚ No cracking and no peeling occured.
o Small cracking occured and peeling occured.
x No peeling occured.
Heating cycle test
⊚ No cracking occured.
x Cracking occured.

TABLE 5

| Example | | 29 | 30 | 31 | 32 | 33 | 34 | 35 |
|---|---|---|---|---|---|---|---|---|
| Composition (in wt %) | $ZrO_2$ | 85.2 | 86.4 | 91.5 | 92.0 | 92.2 | 91.0 | 95.8 |
| | $SiO_2$ | 7.9 | 7.2 | 4.2 | 4.1 | 3.6 | 5.1 | 3.0 |
| | $Al_2O_3$ | 1.9 | 1.8 | 0.7 | 0.9 | 0.6 | 1.2 | 0.1 |
| | $B_2O_3$ | 1.8 | 2.0 | 1.0 | 1.4 | 1.2 | 0.5 | 0.4 |
| | BaO | 1.3 | 1.5 | 1.0 | 0.9 | — | 0.2 | 0.1 |
| | SrO | 0.9 | 0.3 | 0.7 | — | 1.1 | — | — |
| | MgO | 0.2 | — | 0.2 | 0.2 | 0.3 | — | 0.05 |
| | CaO | — | — | — | — | — | — | — |
| | ZnO | — | — | 0.2 | — | — | 1.0 | 0.1 |
| | $Na_2O$ | 0.5 | 0.1 | 0.1 | 0.05 | 0.15 | 0.07 | 0.05 |
| | $K_2O$ | — | 0.4 | 0.1 | 0.05 | 0.5 | 0.6 | 0.05 |
| | $P_2O_5$ | — | — | — | 0.2 | 0.05 | — | 0.1 |
| | $Fe_2O_3$ $TiO_2$ | ≦0.3 | ≦0.3 | ≦0.05 | ≦0.2 | ≦0.3 | ≦0.3 | ≦0.3 |
| Residual stress (in MPa) | | −6 | −20 | −77 | −30 | +50 | +25 | −1 |
| Peeling resistance in one-side heating (0.1° C./min. temperature rise) | | ⊚ | ⊚ | ⊚ | ⊚ | ⊚ | ⊚ | ⊚ |
| Peeling resistance in one-side heating (0.2° C./min. temperature rise) | | ⊚ | ⊚ | o | ⊚ | o | ⊚ | ⊚ |
| Crack resistance in heat cycle | | ⊚ | ⊚ | ⊚ | ⊚ | ⊚ | ⊚ | ⊚ |

TABLE 5-continued

| Example | 29 | 30 | 31 | 32 | 33 | 34 | 35 |
|---|---|---|---|---|---|---|---|
| Electrical resistance at 1500° C. ($\Omega \cdot cm$) | 130 | 170 | 140 | 280 | 120 | 130 | 240 |
| Thermal expansion coefficient of glass phase ($\times 10^{-7}/°C.$) | 50 | 52 | 29 | 49 | 80 | 70 | 60 |

One-side heating test
⊙ No cracking and no peeling occured.
o Small cracking occured and peeling occured.
x No peeling occured.
Heating cycle test
⊙ No cracking occured.
x Cracking occured.

TABLE 6

| Comparative Example | | 15 | 16 | 17 | 18 | 19 | 20 | 21 |
|---|---|---|---|---|---|---|---|---|
| Composition (in wt %) | $ZrO_2$ | 93.4 | 94.7 | 93.6 | 95.4 | 96.1 | 92.0 | 90.6 |
| | $SiO_2$ | 3.8 | 2.6 | 4.5 | 3.5 | 2.6 | 6.1 | 6.1 |
| | $Al_2O_3$ | 1.5 | 2.0 | 0.8 | 0.6 | 0.4 | 0.1 | 0.6 |
| | $B_2O_3$ | — | — | — | — | — | 1.0 | 1.5 |
| | BaO | — | — | — | — | — | 0.25 | — |
| | SrO | — | — | — | — | — | — | 0.5 |
| | MgO | — | — | — | — | — | — | — |
| | CaO | — | — | — | — | — | — | — |
| | ZnO | — | — | — | — | 0.3 | — | — |
| | $Na_2O$ | 0.8 | 0.2 | 0.7 | 0.4 | 0.2 | — | — |
| | $K_2O$ | — | — | — | — | — | 0.25 | 0.5 |
| | $P_2O_5$ | 0.5 | 0.3 | — | — | — | — | — |
| | $Fe_2O_3$ $TiO_2$ | ≦0.1 | ≦0.2 | ≦0.3 | ≦0.3 | ≦0.4 | ≦0.3 | ≦0.2 |
| Residual stress (in MPa) | | +76 | +56 | +72 | +64 | +80 | −85 | −99 |
| Peeling resistance in one-side heating (0.1° C./min. temperature rise) | | x | x | x | x | x | x | x |
| Peeling resistance in one-side heating (0.2° C./min. temperature rise) | | x | x | x | x | x | x | x |
| Crack resistance in heat cycle | | x | x | ⊙ | ⊙ | ⊙ | x | x |
| Electrical resistance at 1500° C. ($\Omega \cdot cm$) | | 310 | 310 | 95 | 145 | 180 | 180 | 160 |
| Thermal expansion coefficient of glass phase ($\times 10^{-7}/°C.$) | | 91 | 96 | 89 | 86 | 95 | 28 | 22 |

One-side heating test
⊙ No cracking and no peeling occured.
o Small cracking occured and peeling occured.
x No peeling occured.
Heating cycle test
⊙ No cracking occured.
x Cracking occured.

TABLE 7

| Comparative Example | | 22 | 23 | 24 | 25 | 26 | 27 | 28 |
|---|---|---|---|---|---|---|---|---|
| Composition (in wt %) | $ZrO_2$ | 92.1 | 92.3 | 94.2 | 94.2 | 92.9 | 94.8 | 92.2 |
| | $SiO_2$ | 3.7 | 4.1 | 3.6 | 3.5 | 4.8 | 3.6 | 3.6 |
| | $Al_2O_3$ | 1.2 | 1.4 | 1.2 | 1.0 | 0.8 | 0.7 | 0.6 |
| | $B_2O_3$ | 0.5 | — | 0.4 | 0.2 | 1.1 | 0.5 | 1.2 |
| | BaO | 0.6 | 1.1 | 0.2 | 0.6 | — | — | — |
| | SrO | — | 0.8 | 0.1 | 0.2 | — | — | 1.1 |
| | MgO | — | — | — | — | — | — | 0.3 |
| | CaO | 0.3 | — | 0.1 | 0.2 | — | — | — |
| | ZnO | 1.5 | — | 0.5 | — | — | — | — |
| | $Na_2O$ | — | — | — | — | 0.06 | 0.05 | — |

TABLE 7-continued

| Comparative Example | 22 | 23 | 24 | 25 | 26 | 27 | 28 |
|---|---|---|---|---|---|---|---|
| $K_2O$ | — | — | — | — | — | — | — |
| $P_2O_5$ | — | — | — | — | 0.5 | 0.2 | 0.5 |
| $Fe_2O_3$ ] | ≦0.1 | ≦0.1 | ≦0.1 | ≦0.1 | ≦0.1 | ≦0.1 | ≦0.3 |
| $TiO_2$ | | | | | | | |
| Residual stress (in MPa) | −94 | −83 | −85 | −84 | −69 | −75 | +7 |
| Peeling resistance in one-side heating (0.1° C./min. temperature rise) | x | x | x | x | ⊚ | ⊚ | ⊚ |
| Peeling resistance in one-side heating (0.2° C./min. temperature rise) | x | x | x | x | ○ | ○ | ○ |
| Crack resistance in heat cycle | ⊚ | ⊚ | ⊚ | ⊚ | x | x | x |
| Electrical resistance at 1500° C. (Ω · cm) | 220 | 200 | 190 | 200 | 220 | 120 | 365 |
| Thermal expansion coefficient of glass phase (×$10^{-7}$/°C.) | 37 | 25 | 32 | 29 | 34 | 32 | 64 |

One-side heating test
⊚ No cracking and no peeling occured.
○ Small cracking occured and peeling occured.
x No peeling occured.
Heating cycle test
⊚ No cracking occured.
x Cracking occured.

We claim:

1. A fused refractory composition consisting essentially of 90–95 wt % $ZrO_2$, 3–5.5 wt % $SiO_2$, 0.1–1.5 wt % $Al_2O_3$, 0.05–2 wt % $B_2O_3$, 0.05–2 wt % BaO, SrO and MgO in total, at least 0.05 wt % $Na_2O$, 0.05–0.3 wt % $Na_2O$ and $K_2$ in total, and 0.3 wt % or less $Fe_2O_3$ and $TiO_2$ in total, and containing substantially no $P_2O_5$ or CuO.

2. A fused refractory composition as claimed in claim 1 having a surface with a residual stress which is either a tensile stress of 80 MPa or less, or a compressive stress of 50 MPa or less.

3. A fused refractory composition as claimed in claim 2 containing at least 0.05 wt % $K_2O$ and having an electrical resistance at 1500° C. of 150 Ω cm.

4. A fused refractory composition as claimed in claim 1 containing 0.05 wt % or more of $K_2O$ and having an electrical resistance at 1500° C. of at least 150 Ω cm.

5. A fused refractory composition consisting essentially of 85–96 wt % $ZrO_2$, 3–8 wt % $SiO_2$, 0.1–2 wt % $Al_2O_3$, 0.05–3 wt % $B_2O_3$, 0.15–3 wt % BaO, SrO and MgO in total, at least 0.05 wt % $Na_2O$, 0.05–0.6 wt % $Na_2O$ and $K_2O$ in total, and 0.3 wt % or less $Fe_2O_3$ and $TiO_2$ in total and 0.2 wt % or less $P_2O_5$.

6. A fused refractory composition as claimed in claim 5 having a surface with a residual stress which is either a tensile stress of 80 MPa or less, or a compressive stress of 50 MPa or less.

7. A fused refractory composition as claimed in claim 6 having a glass with a thermal expansion coefficient of 30×$10^{-7}$/°C. to 80×$10^{-7}$/°C.

8. A fused refractory composition as claimed in claim 6 having a glass phase with a thermal expansion coefficient of 40×$10^{-7}$/°C. to 70×$10^{-7}$/°C.

9. A fused refractory composition as claimed in claim 5 containing at least 0.05 wt % $K_2O$ and having an electrical resistance at 1500° C. of at least 150 Ω cm.

10. A fused refractory composition as claimed in claim 5 having a glass with a thermal expansion coefficient of 30×$10^{-7}$/°C. to 80×$10^{-7}$/°C.

11. A fused refractory composition as claimed in claim 5 having a glass phase with a thermal expansion coefficient of 40×$10^{-7}$/°C. to 70×$10^{-7}$/°C.

12. A fused refractory composition consisting essentially of 90–95 wt % $ZrO_2$, 3–5.5 wt % $SiO_2$, 0.1–1.5 wt % $Al_2O_3$, 0.05–2 wt % $B_2O_3$, 0.05–2 wt % BaO, SrO and MgO in total, at least. 0.05 wt % $Na_2O$, 0.05–0.3 wt % $Na_2O$ and $K_2O$ in total, and 0.3 wt % or less $Fe_2O_3$ and $TiO_2$ in total and 0.2 wt % or less $P_2O_5$.

13. A fused refractory composition as claimed in claim 12 having a surface with a residual stress which is either a tensile stress of 80 MPa or less, or a compressive stress of 50 MPa or less.

14. A fused refractory composition as claimed in claim 12 containing at least 0.05 wt % $K_2O$ and having an electrical resistance at 1500° C. of 150 Ω cm or more.

15. A fused refractory composition as claimed in claim 12 having a glass with a thermal expansion coefficient of 30×$10^{-7}$/°C. to 80×$10^{-7}$/°C.

16. A fused refractory composition as claimed in claim 12 having a glass phase with a thermal expansion coefficient of 40×$10^{-7}$/°C. to 70×$10^{-7}$/°C.

* * * * *

UNITED STATES PATENT AND TRADEMARK OFFICE
CERTIFICATE OF CORRECTION

PATENT NO.  : 5,679,612
DATED       : October 21, 1997
INVENTOR(S) : ENDO et al

It is certified that error appears in the above-indentified patent and that said Letters Patent is hereby corrected as shown below:

Col. 3, line 39, "mill" should read --will--.

Col. 10, line 41, "38" should read --35--.

Col. 19, line 31, "$K_2$" should read --$K_2O$--;

line 40, after "of" insert --at least--; and line 55, after "glass" insert --phase--.

Col. 20, line 31, after "glass" insert --phase--; and line 52, after "glass" insert --phase--.

Signed and Sealed this

Fifteenth Day of September, 1998

Attest:

BRUCE LEHMAN

*Attesting Officer*  *Commissioner of Patents and Trademarks*